(12) United States Patent
Chandrasekaran

(10) Patent No.: US 6,823,347 B2
(45) Date of Patent: Nov. 23, 2004

(54) PROPAGATING COMMIT TIMES

(75) Inventor: Sashikanth Chandrasekaran, Belmont, CA (US)

(73) Assignee: Oracle International Corporation, Redwood Shores, CA (US)

(*) Notice: Subject to any disclaimer, the term of this patent is extended or adjusted under 35 U.S.C. 154(b) by 62 days.

(21) Appl. No.: 10/422,281

(22) Filed: Apr. 23, 2003

(65) Prior Publication Data

US 2004/0213387 A1 Oct. 28, 2004

(51) Int. Cl.$^7$ ............................................. G06F 17/30
(52) U.S. Cl. ..................... 707/201; 707/104.1; 707/202
(58) Field of Search ................................ 707/201, 200, 707/8, 1, 10, 104.1; 714/8

(56) References Cited

U.S. PATENT DOCUMENTS 6,343,286 B1 * 1/2002 Lee et al. ........................ 707/3
6,397,227 B1 * 5/2002 Klein et al. .................. 707/200
6,567,928 B1 * 5/2003 Lyle et al. ..................... 714/15
6,651,073 B1 * 11/2003 Lyle et al. ................... 707/202
6,694,340 B1 * 2/2004 Lyle et al. ................... 707/204

* cited by examiner

Primary Examiner—Diane D. Mizrahi
Assistant Examiner—Yicun Wu
(74) Attorney, Agent, or Firm—Christopher J. Brokaw; Hickman Palermo Truong & Becker LLP

(57) ABSTRACT

A method and mechanism for propagating commit times between a plurality of database servers is provided. A database server maintains a set of one or more values that indicate which timestamps have been exchanged with at least one other database server that shares access to a common database. The one or more values maintained by the database server include a first value describing the most recent timestamp that the database server has sent to another database server and a second value describing the most recent timestamp that the database server has received from the other database server. The database server determines whether to send a commit timestamp associated with a committing transaction to another database server based, at least in part, on the set of one or more values. These techniques may be utilized for propagating commit times between any number of database servers.

30 Claims, 8 Drawing Sheets

SENDING A COMMIT MESSAGE TO A NODE

PROPAGATING COMMIT TIMES

FIELD OF THE INVENTION

The present invention generally relates to computer-systems and, more specifically, relates to a method and mechanism for reducing propagation delays in a database system.

BACKGROUND OF THE INVENTION

A database server is a computerized entity that is used in managing a database, and a client is an application that requests information from a database server. A database system is a collection of one or more database servers. Each database server in a database system is called a node. A node in a distributed database system can perform the functions of a client, a database server, or both. In certain cases, a particular node may perform the functions of multiple database servers, multiple clients, or both. However, for explanation purposes, a node will be described as functioning as a single database server.

A multi-version database system is a database system that manages concurrency control via versions and snapshots of the same database. In a multi-version parallel database system, transactions executing on a plurality of database servers can concurrently access the same database. For a particular transaction, the versions of the data obtained from the database are typically the versions that were current at a particular point in time. The set of all database data that is current as of a particular point in time is commonly termed a "database snapshot."

To provide transactions with database snapshots, a multi-version parallel database system typically stamps each version of data with a logical timestamp. The logical timestamp assigned to a version of data is typically referred to as a version number. When a transaction requires data from a multi-version database, the database server assigns one or more logical timestamps to the transaction. The logical timestamps that are assigned to transactions are commonly called "snapshot times" as they are used to determine the database snapshot that should be used with particular transactions. Snapshot times are generally provided to a transaction through the use of a logical clock that is maintained by each database server.

When a transaction commits, the transaction is assigned another logical timestamp. The logical timestamp assigned upon commit is referred to as the commit time of the transaction. All changes made by a transaction are considered to have been made at the commit time of the transaction. To supply an ordering to changes within a database, the logical clock of a database server is typically incremented after it is assigned as the commit time of a transaction. Consequently, transactions that commit are assigned commit times that are greater than previously committed transactions.

Thus, logical clocks maintained by database servers are used to provide logical timestamps for a variety of reasons (e.g. snapshot times, version numbers, commit times). Because each database server maintains its own logical clock, a transaction may be assigned a snapshot time that causes information to be read that is slightly older than the most current version. However, because the information obtained for a transaction is from a particular database snapshot, the transaction is guaranteed to receive consistent information that was current as of the particular snapshot time.

FIG. 1 depicts a multi-version parallel database system 100 in which a plurality of database servers (104, 106, and 108) provide snapshot times to transactions for accessing database snapshots from a multi-version database 102. In this example, the multi-version database 102 is represented using a plurality of database snapshots 114. Each database snapshot 114 represents a virtual state of data as it existed in multi-version database 102 as of database logical timestamps T23–T31. In this example, T31 represents the most recent database snapshot of multi-version database 102.

Respectively associated with the database servers 104, 106 and 108 are logical clocks 110, 112 and 113. Currently executing on database servers 104, 106 and 108 are transactions 116–118, 120–122 and 124–128. As depicted, each transaction is executing using data from a particular database snapshot.

When a process executing on a database server begins a transaction, the transaction is assigned a particular snapshot time based on the logical clock that is associated with the database server. The snapshot time guarantees that the version of the data items supplied to the process for the transaction will reflect the state of those data items as of the particular snapshot time. For example, if a transaction TX1 is assigned a transaction snapshot time of T1, the process executing the transaction is guaranteed to be supplied with data items that reflect a state as of time T1, even if the data items have been subsequently modified. However while the process is guaranteed to be provided with a consistent set of data items from the database as of the snapshot time, the process may see information that is slightly older than the most current version of the database.

A transaction is considered committed after its changes are made persistent in the database. In certain systems, to commit a transaction, the transaction requests the database server on which it is executing to assign it a commit time. The database server then obtains a commit time from its logical clock and assigns it to the transaction. After obtaining the commit time, the logical clock is then incremented. A log force is then initiated. The log force writes information (redo records) describing the changes made by the transaction to disk. Once the log force is complete, the changes are made persistent in the database. The database may then report to the user that the transaction is committed.

For example, when transaction 120 began executing on database server 106, the database server 106 accessed its logical clock 112 and assigned transaction 120 a snapshot time of T26. Based on a snapshot time of T26, the transaction 120 is provided with a database snapshot 114 as of the logical timestamp T26. Thus, transaction 120 is guaranteed that it will see a consistent set of data from the multi-version database 102 as of snapshot time T26. When transaction 120 completes and is ready to commit, the database server 106 will assign transaction 120 a commit time based on the current value of its logical clock 112. For example, the logical clock 112 of database server 106 may have incremented to a logical time value of T30. Transaction 120 would then be assign a commit time of T30 for committing its changes to the multi-version database 102. These changes can then be seen by transactions that are assigned a snapshot time of T30 or greater.

Because each database server maintains its own logical clock, whether a particular transaction will see a particular change made to the database depends not only on the current logical clock value associated with the database server in which the transaction is executing, but also on the logical clock values that are associated with the other database servers of the database system. Thus, by having each database server maintain its own logical clock, a time dependency is formed between the transactions executing on different database servers of the database system. This time dependency causes a propagation delay to be introduced into the database system that can cause updates that occurred prior to reading the database not to be seen.

A maximum propagation delay period is the maximum interval of time for which changes committed by transaction executing on one database server are propagated to the transactions executing on other database servers of the database system. This maximum propagation delay period guarantees that if a transaction commits changes from one database server, that the committed changes will be seen by all other database servers of the system if a query is performed after the maximum propagation delay period. Thus, if the maximum propagation delay period is greater than zero, then the changes caused by a transaction committing on one database server are not guaranteed to be seen by other database servers if a query is performed after the transaction commits but before the maximum propagation delay period expires.

For example, a husband may make a deposit into an account A using transaction 118. If when the transaction 118 completes it is assigned a commit time of T31 by database server 104, when the changes are written into the multi-version database 102 they will have a database logical timestamp of T31. If after transaction 118 commits, the husband's wife attempts to obtain the balance of account A using transaction 120 on database server 106, because transaction 120 was assigned a snapshot time of T26 by database server 106, the balance of account A will not reflect the prior deposit that was made by the husband. Therefore, as long as the logical clock 112 is less than T31, any transaction that is assigned a snapshot time on database server 106 will not see the changes made to the multi-version database 102 by transaction 118.

One method of reducing the maximum propagation delay period in a multi-version parallel database system is by synchronizing the logical clocks associated with each database server on a periodic basis. For example, the propagation delay period can be reduced to a maximum of three seconds by having a centralized process periodically requesting each database server to send to the centralized process its current logical clock's time value every three seconds. After receiving the logical clock values from all of the database servers, the centralized process can then determine the greatest time value and send it to each database server of the system. Each database server then uses the delivered time value to cause its own logical clock to represent a time that is at least as great (i.e. recent) as the delivered time value.

Having a central process that synchronizes the logical clocks associated with each database server on a periodic basis can be used to reduce the maximum propagation delay period to a certain point. However, as the synchronizing period is reduced to achieve a smaller maximum propagation period, the overhead associated with constantly sending messages to each database server quickly becomes unreasonable. In addition, in certain systems, it is imperative to maintain a maximum propagation delay of zero to prevent data anomalies. However, using a central process for sending messages to periodically synchronize the logical clocks associated with each database server cannot completely eliminate the propagation delay as there will always be a period of time when the logical clocks are not synchronized.

One approach to implementing a maximum propagation delay of zero in a multi-version parallel database system involves requiring each database server to consult a global logical clock service to obtain a most recent logical time value (timestamp) for its logical clock before it assigns a snapshot time to a transaction. For example, one database server, called a global clock service, can be assigned the task of running a global clock. When other database servers need to assign a transaction a snapshot time, they send a message to the global clock service requesting a timestamp. Upon receipt of such messages, the global clock service would generate a timestamp, either by reading its hardware clock or, more easily, by incrementing a software-based serial number counter, and send the timestamp to the requester.

This approach is known as the "on-demand" approach and is in common use today. However, the "on-demand" approach has a substantial drawback. As the system grows, a greater number of database servers must communicate with the global clock server. As a result, more time is spent waiting for the global clock server to handle all the requests. Certain improvements to the global clock server approach can be made. However, the basic design is ultimately limited by the single global point of timestamp generation, which can become a performance bottleneck for the entire system. In addition, and possibly more importantly, each process executing a transaction is required to block itself while waiting for a timestamp to be obtained from the global clock, thus causing a context switch to occur. These context switches typically require several thousand instructions and thus inducing a large amount of overhead into a database system.

Another approach for reducing propagation delays between a plurality of database servers that have access to a common database involves associating each database server with a logical clock. In response to initiating a commit of a transaction executing on a database server, a commit time for the transaction is determined and broadcast to one or more other database servers. The broadcast is overlapped with a transaction log force. Upon receiving the commit time, the database servers compare the transmitted commit time to the time indicated by their logical clock. If the commit time is greater than the time indicated by their logical clock, then the database server sets its logical time to reflect a time that is at least as recent as the time reflected by the transmitted commit time.

While this approach is able to overlap the transaction log force and the broadcast of the commit times, the approach still incurs a significant cost for broadcasting the commit timestamps. If there are N database servers, then N−1 commit messages and N−1 commit acknowledgments must be sent. The transaction is considered committed only after the N−1 commit acknowledgments have been received for the N−1 commit messages. As the number of commit messages sent increases, there is a significant increase in both the share of the CPU consumed and the latency of other messages (e.g. lock requests, query response) that may be sent by the database servers.

Based on the foregoing, it is highly desirable to provide a mechanism for reducing the cost of the immediate propagation of commit times between database servers.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for propagating commit times between a plurality of database servers is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Figure 1:
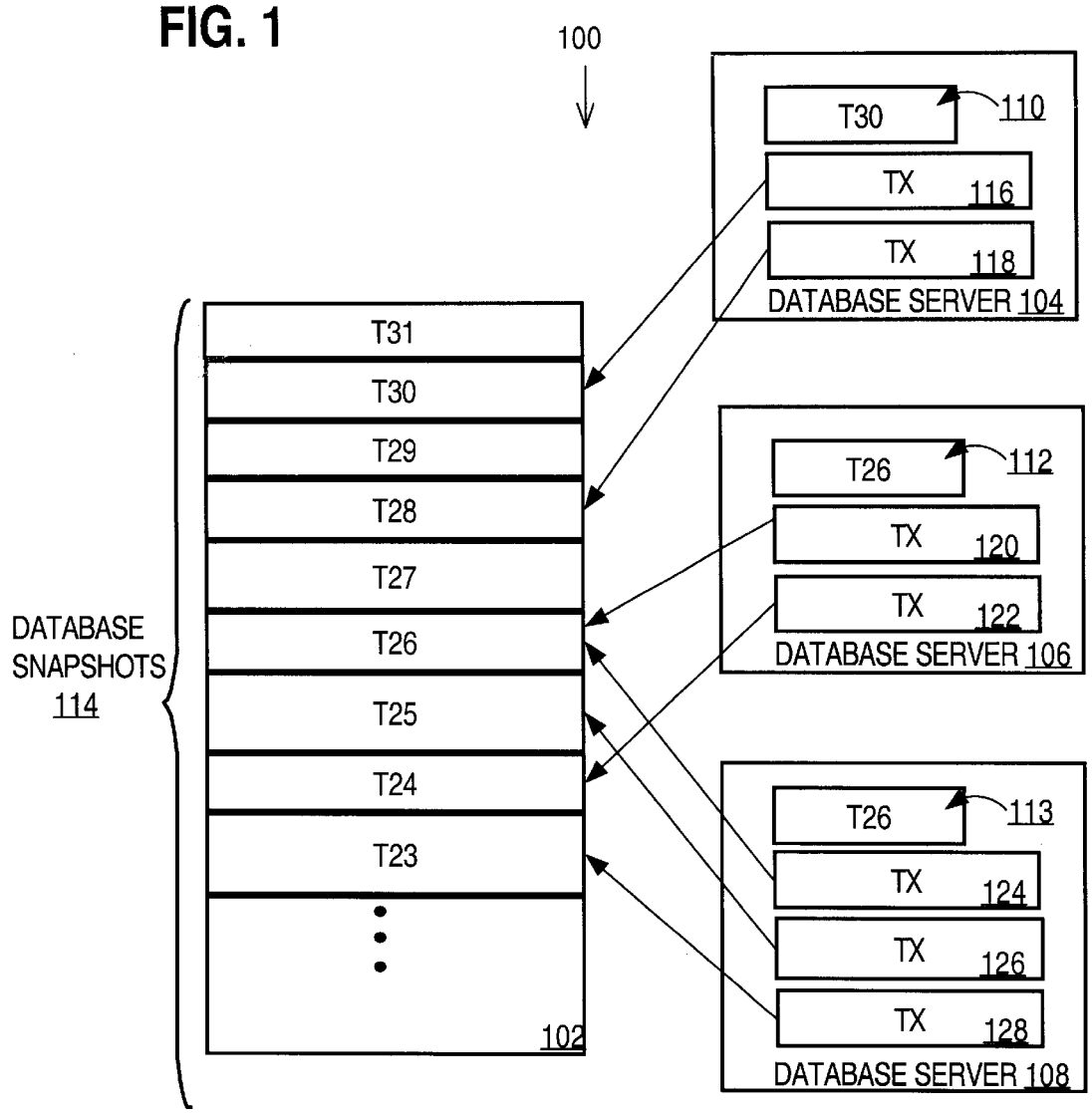
FIG. 1 is a depiction of a multi-version parallel database system in which a plurality of database servers provide snapshot times to transactions for accessing database snapshots from a multi-version database.
Figure 2:
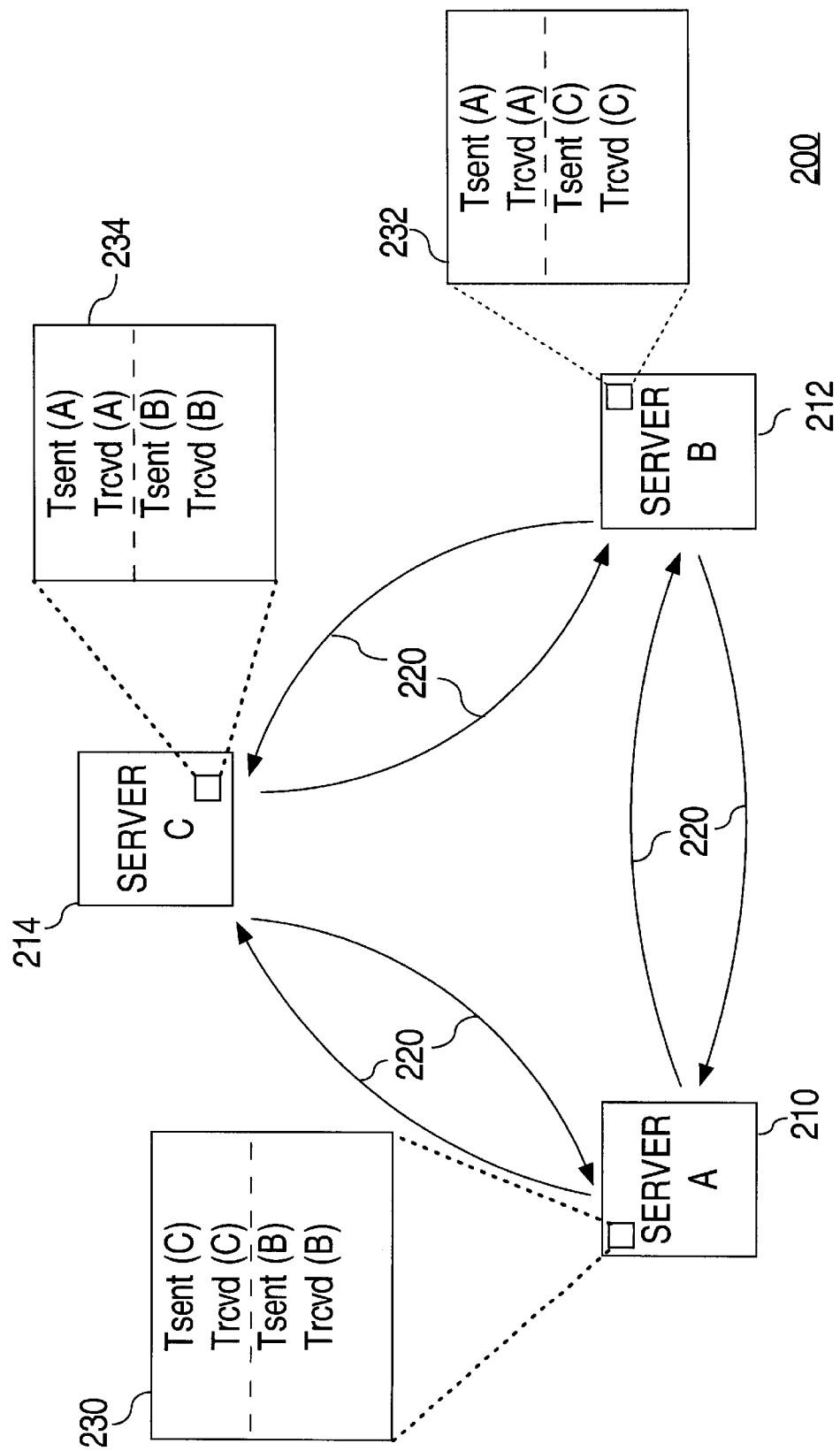
FIG. 2 is a block network diagram illustrating a database server system 200 configured according to an embodiment of the invention.

In the following description, the various features shall be discussed and grouped under the headings listed below:

I. Architecture Overview
II. Functional Overview
III. Propagating Commit Times
IV. Implementing Mechanisms
I. Architecture Overview FIG. 2 is a block network diagram illustrating a database server system 200 configured according to an embodiment of the invention. The database server system 200 may be used to propagate commit between database servers without incurring the disadvantages of prior approaches. The database server system 200 includes database servers 210, 212, and 214 and communications links 220.

A database server, such as database servers 210, 212, and 214, as broadly used herein, is any computerized entity that is used in managing a database. Each of database servers 210, 212, and 214 are operatively connected to a common database (not depicted in FIG. 2). A particular database server, e.g., database server 210, 212, or 214, may be referred to as a node of the database server system 200. In other words, the term 'node' as used herein refers to a particular database server of the database server system 200.

Communications links 220 may be implemented by any medium or mechanism that provides for the exchange of data between nodes of the database server system 200. Examples of communications links 220 include, without limitation, a network such as a Local Area Network (LAN), Wide Area Network (WAN), Ethernet or the Internet, one or more terrestrial, satellite or wireless links, and serial or parallel printer cables.

Each database server maintains a set of timestamps. For example, database server 210 maintains a set of timestamps 230, database server 212 maintains a set of timestamps 232, and database server 214 maintains a set of timestamps 234. A timestamp is a record that indicates a particular point in time. Timestamps, for example, may express a particular date and time to a very precise degree. Timestamps may be used to express the time when activities of a database server take place, e.g., timestamps may express when a particular transaction commits.

II. Functional Overview

Figure 3:
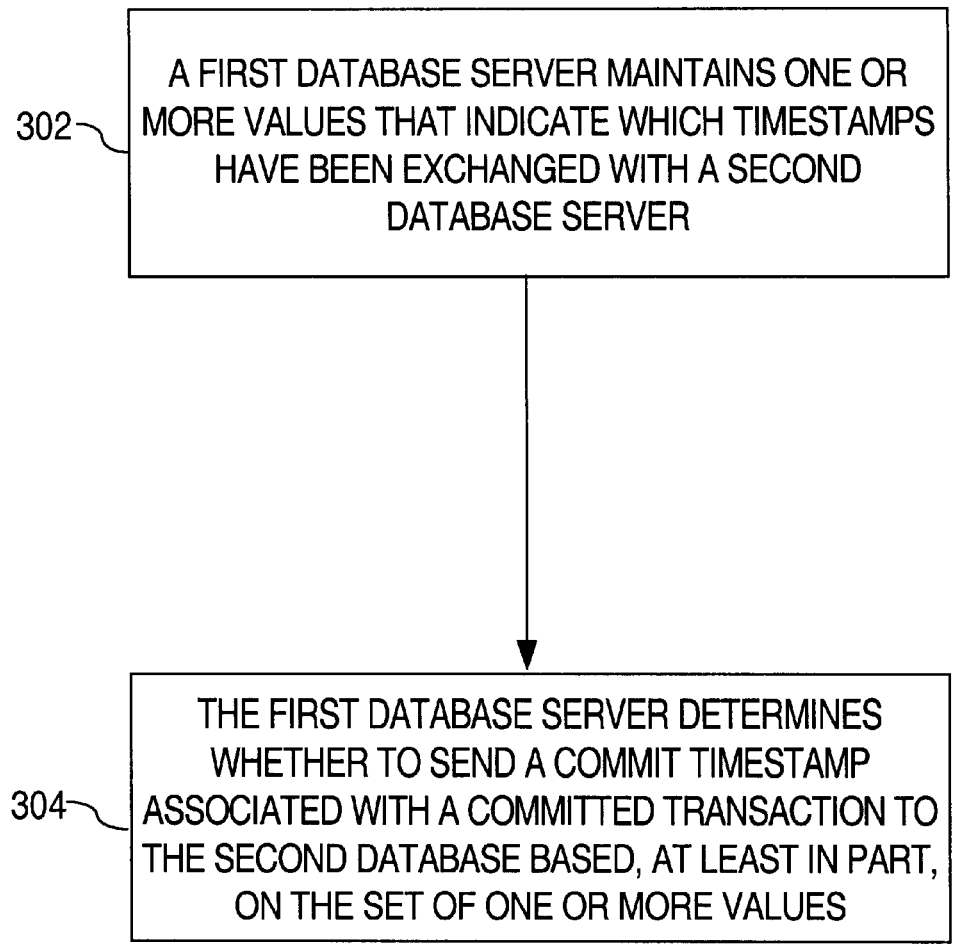
FIG. 3 is a flowchart of the high level functional steps propagating commit times according to an embodiment of the invention.

FIG. 3 is a flowchart of the high level functional steps for propagating commit times according to an embodiment of the invention. In step 302, a first database server maintains a set of one or more values that indicate which timestamps have been exchanged with a second database server. The second database server shares access to a common database with the first database server.

In step 304, in response to committing a transaction that involves the common database, the first database server determines whether to send a commit timestamp associated with the committed transaction to the second database server based, at least in part, on the set of one or more values. Accordingly, the first database server need not always send a commit timestamp associated with the committed transaction to every other node in the database server system 200. The integrity of the database is ensured with minimal overhead, and the cost of propagating commit times is reduced between the first database server and second database server by use of the one or more values. Techniques described herein are applicable for use with any number of database servers.

III. Propagating Commit Times

Embodiments of the invention reduce the cost of propagating commit times between nodes by synchronizing a set of logical timestamps maintained at each node to timestamps attached to messages exchanged between the nodes. Messages are exchanged continually between the nodes at least once in a prescribed amount of time, which is referred to as the heartbeat-interval. Messages are exchanged between nodes in normal operations for a variety of reasons, e.g., following a log protocol, in requesting a lock, in the sending of blocks from one node to another, etc.

In an embodiment, each node appends a timestamp of the current value of the node's logical clock to some or all of the messages that the node sends to other nodes. Timestamps may be appended to messages using well-known means to those skilled in the art. Timestamps may be, although they need not be, expressed as numerical values. In some embodiments, timestamps may be compared using numerical operators. For example, if timestamp A is greater than timestamp B, then timestamp A is more recent than timestamp B. In other example, if timestamp C is less than or equal to timestamp D, then timestamp C is the same time or older than timestamp D. For the ease of explanation, timestamps are discussed below with reference to numerical comparisons, but those skilled in the art shall recognize that a first timestamp is greater than a second timestamp if the first timestamp is more recent than the second timestamp, a third timestamp is less than a fourth timestamp if the third timestamp is less recent than the fourth timestamp, and two timestamps are equal if they refer to the same point in time.

In an embodiment, each node maintains two timestamps for every other node in the database server system 200. The two timestamps each node maintains for every other node in the database server system 200 are (a) the most recent timestamp that the node has attached to a message sent to the other node (hereinafter referred to as "Tsent"), and (b) the most recent timestamp that the node has been received in a message from the other node (hereinafter referred to as "Trcvd").

For example, in the embodiment depicted in FIG. 2, server 210 maintains a set of timestamps 230, server 212 maintains a set of timestamps 232, and server 214 maintains a set of timestamps 234. The set of timestamps 230 maintained by server 210 includes four timestamps, namely, (1) Tsent for node C, (2) Tsent for node B, (3) Trcvd for node C, and (4) Trcvd for node B. The set of timestamps 232 maintained by server 212 includes four timestamps, namely, (1) Tsent for node C, (2) Tsent for node A, (3) Trcvd for node C, and (4) Trcvd for node A. The set of timestamps 234 maintained by server 214 includes four timestamps, namely, (1) Tsent for node A, (2) Tsent for node B, (3) Trcvd for node A, and (4) Trcvd for node B.

Figure 4:
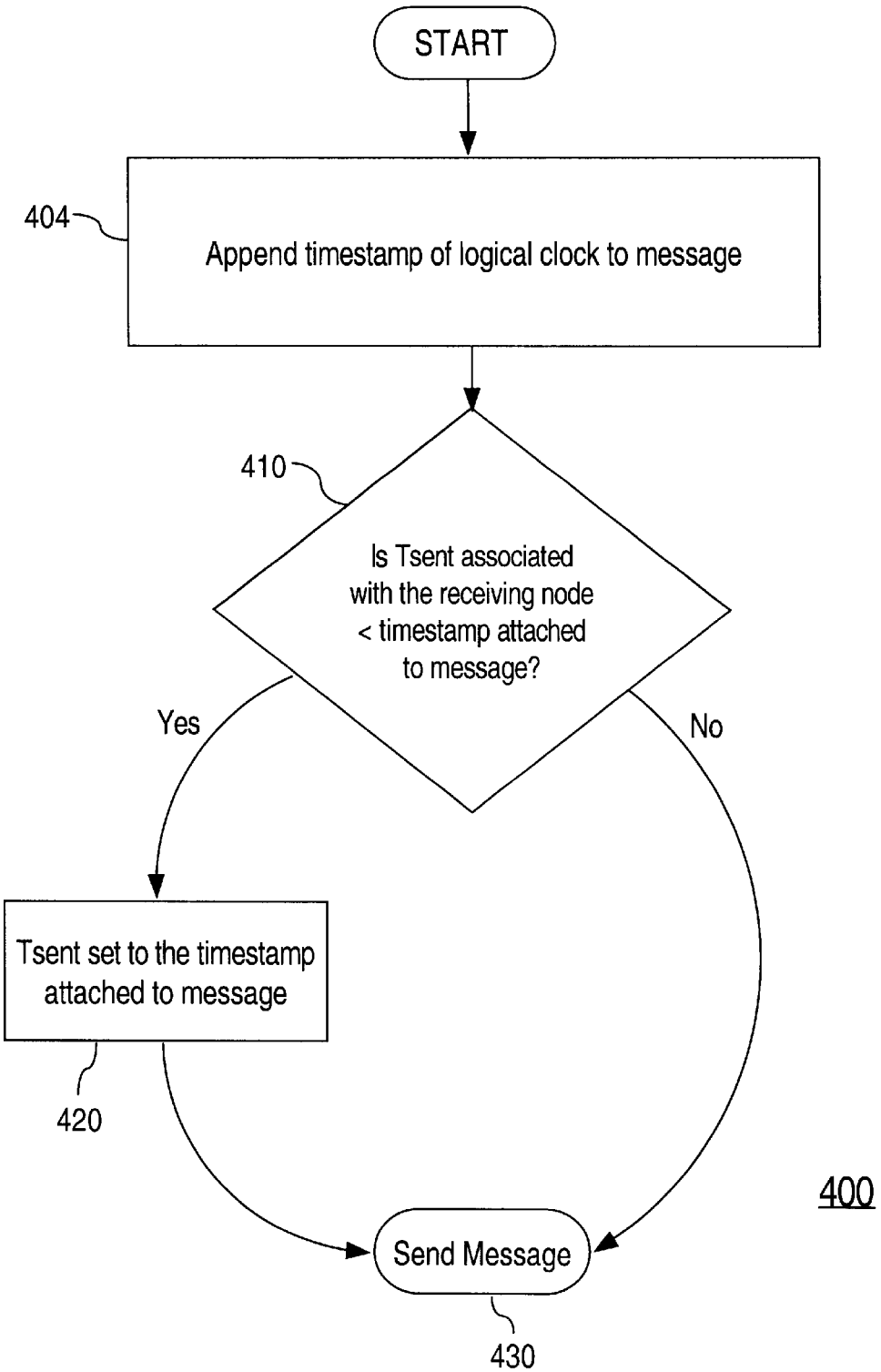
FIG. 4 is a flowchart illustrating the functional steps for a node to send a message to another node according to an embodiment of the invention.

FIG. 4 is a flowchart illustrating the functional steps for a node to send a message to another node according to an embodiment of the invention. Initially, in step 404, a timestamp expressing the value of the sending node's logical clock is appended to the message. Thereafter, in step 410, the sending node determines if the value of Tsent associated with the receiving node is less than the timestamp attached to the message being sent. If the determination of step 410 is negative, then processing proceeds to step 430. If the determination of step 410 is positive, then processing proceeds to step 420. In step 420, the value of Tsent associated with the receiving node is set to the value of the timestamp attached to the message being sent. After step 420, processing proceeds to step 430. In step 430, the sending node sends the message to the receiving node.

Figure 5:
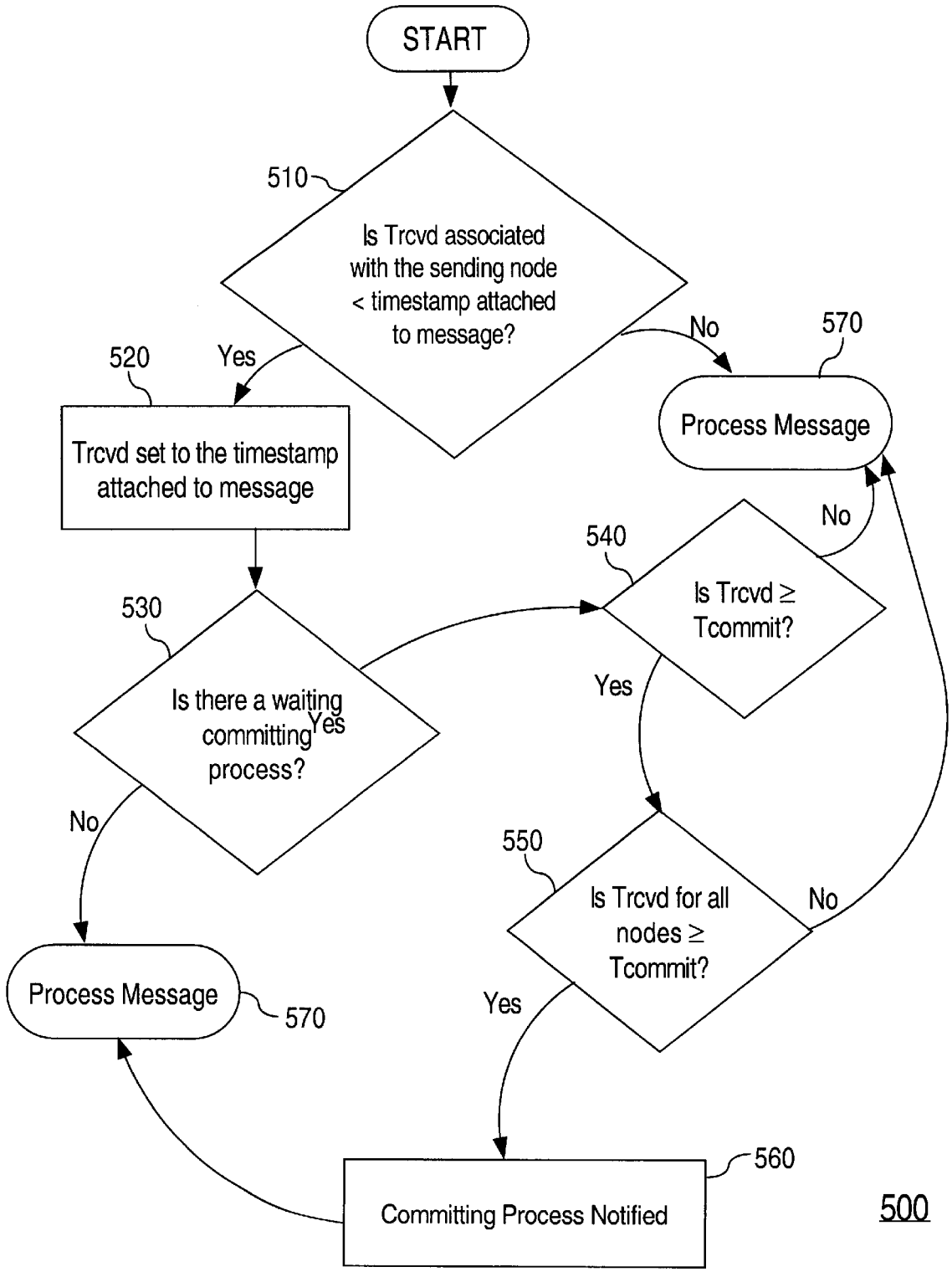
FIG. 5 is a flowchart illustrating the functional steps for a node to receive a message from another node according to an embodiment of the invention.

FIG. 5 is a flowchart illustrating the functional steps for a node to receive a message from another node according to an embodiment of the invention. Initially, in step 510, when a node ("the receiving node") receives a message from another node ("the sending node") the receiving node determines if Trcvd associated with the sending node is less than the timestamp that is attached to the message. If the determination of step 510 is negative, then processing proceeds to step 570. In step 570, the received message is processed. If the determination of step 510 is positive, then processing proceeds to step 520. In step 520, Trcvd is set to the value of the timestamp attached to the message. Well known concurrency control techniques such as, e.g., atomic compare-and-swap, and latching, may be used to check and set the timestamps. Before discussing the remainder of FIG. 5, the reader may benefit from a discussion of the operation of commit messages in the database server system 200.

Figure 6:
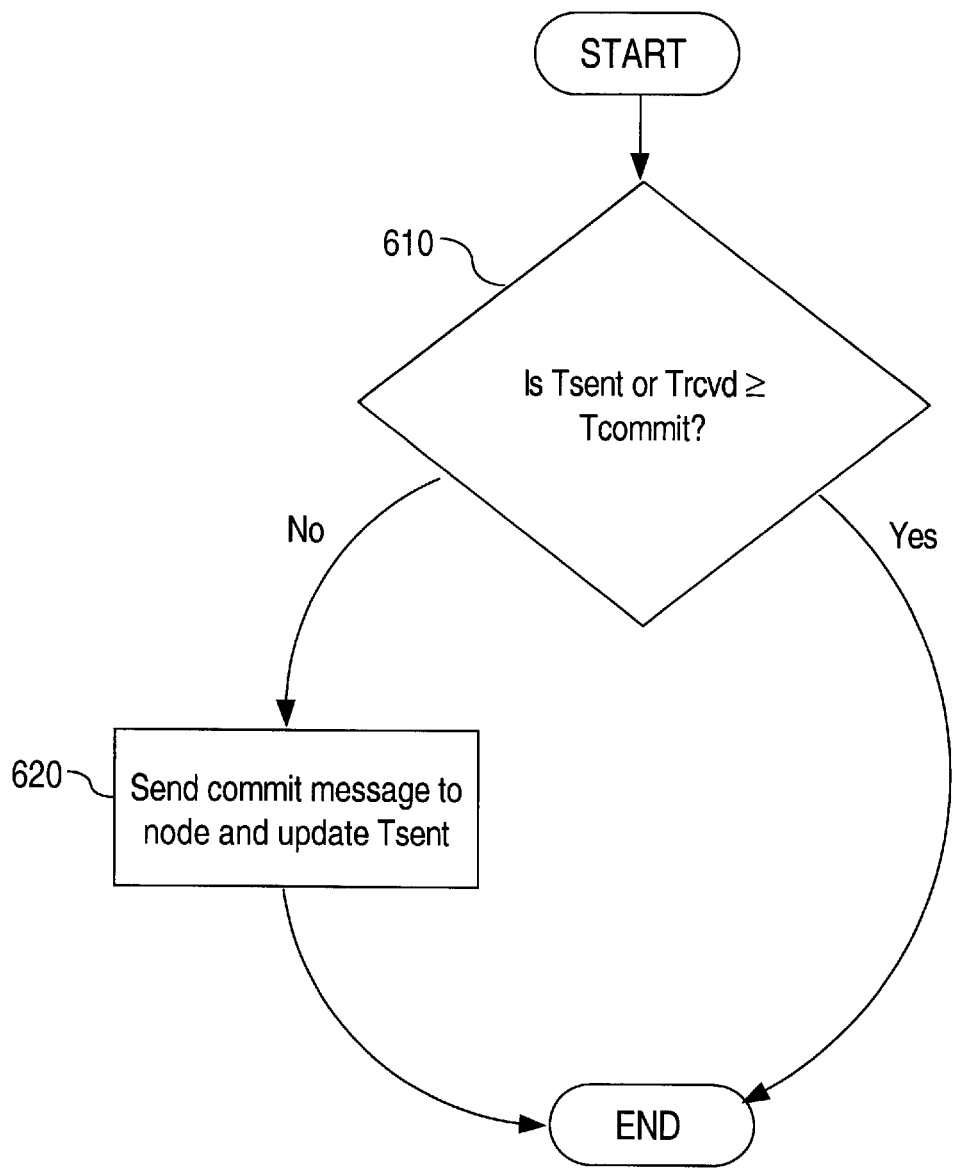
FIG. 6 is a flowchart illustrating the functional steps for a node to send a commit message to another node according to an embodiment of the invention.

FIG. 6 is a flowchart illustrating the functional steps for a node ("the committing node") to send a commit message to another node ("the remote node") according to an embodiment of the invention. The committing node performs the functions illustrated in FIG. 6 for every other node in the database server system 200. For example, in FIG. 2, if database server 210 was the committing node, then database server 210 would perform the functions of FIG. 6 for each of database servers 212 and 214. When a transaction commits, a commit timestamp, referred to as Tcommit, may be required to be propagated to the other database servers (or nodes) to ensure that the remote nodes use a snapshot time at least as recent as the commit time for further operations.

Initially, in step 610, at the committing node, a determination is made to check, for a remote node, if either Tsent or Trcvd associated with the remote node is greater than or equal to Tcommit. The value of Tsent associated with a remote node may be greater than or equal to Tcommit when another message was sent to that remote node from this node, e.g., in requesting a lock or transferring a block, immediately after the current timestamp, Tcommit, was generated. Similarly, the value of Trcvd may be greater than or equal to Tcommit if the remote node has already advanced its logical clock to or past Tcommit, e.g., because there are more transactions committing in that node.

If the determination of step 610 is positive, then a commit propagation message is not sent. If the determination of step 610 is negative, then processing proceeds to step 620. In step 620, a commit propagation message is sent from the committing node to the remote node. Further, in step 620, the value of Tsent stored at the committing node that is associated with the remote node is set to the value of Tcommit in the commit propagation message sent to the remote node. Also in step 620, the committing process may become blocked if, at the committing node, the value of Trcvd associated with any other node is not at least as recent as the value of Tcommit. While the value of Trcvd associated with any other node is not at least as recent as the value of Tcommit at the committing node, the committing process will not be able to commit the transaction. The committing process may be blocked until the committing node can ensure that the logical clocks of every other node in the database server system 200 are at least as recent as Tcommit. The committing process may be free to do other work, e.g., initiating anther write to the redo log on behalf of other transactions.

Figure 7:
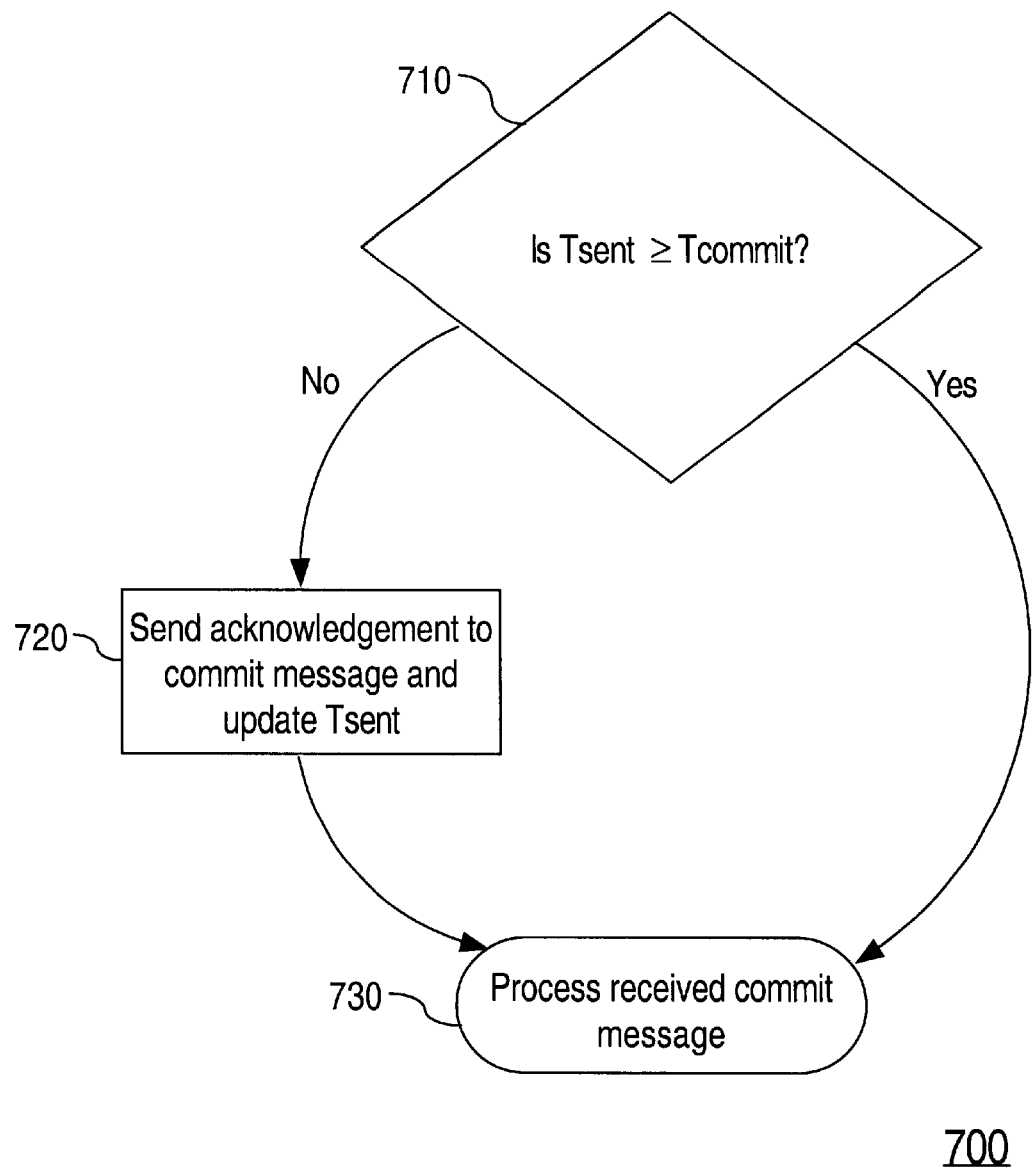
FIG. 7 is a flowchart illustrating the functional steps for a node to receive a commit message from another node according to an embodiment of the invention.

FIG. 7 is a flowchart illustrating the functional steps for a node ("the receiving node") to receive a commit message from another node ("the remote node") according to an embodiment of the invention. Initially, in step 710, when a node receives a commit propagation message from the remote node with timestamp Tcommit the receiving node determines if the value of Tsent associated with the remote node is greater than or equal to the value Tcommit associated with the commit propagation message. The value of Tsent may be greater than or equal to the value of Tcommit if the receiving node had already advanced its timestamp to or past Tcommit and sent a message to the remote node, e.g., for purposes of requesting a lock or transferring a block. If the determination of step 710 is positive, then an acknowledgment message need not be sent to the remote node, as the receiving node has already sent a message to the remote node with a timestamp at least as recent as Tcommit. If the determination of step 710 is negative, then processing proceeds to step 720. In step 720, an acknowledgement message is sent from the receiving node to the remote node. Further, in step 720, the value of Tsent at the receiving node associated with the remote node is set equal to the value of the timestamp appended to the acknowledgement message.

Returning to FIG. 5, when a message is received at a receiving node from a sending node, the value of Trcvd associated with the node that sent the received message may be updated, if necessary, as described above with reference to steps 510 and 520. After step 520 has been performed, processing proceeds to step 530. In step 530, a determination is made to check if there is a waiting committing process at the receiving node. A committing process is waiting if the committing process has not received notification, e.g., a message that is coupled with a Trcvd value, from each other node that the node has advanced their logical clock past the timestamp associated with the waiting committing process. Usually the committing process is a single process in the system, such as the redo log writer.

If the determination of step 530 is negative, then processing proceeds to step 570. If the determination of step 530 is positive, then processing proceeds to step 540. In step 540, a determination is made to check if the value of Trcvd that was updated in step 520 is greater than or equal to the value of Tcommit associated with the waiting committing process. If the determination of step 540 is negative, then processing proceeds to step 570. If the determination of step 540 is positive, then processing proceeds to step 550.

In step 550, a determination is made to check, if at the receiving node, the value of Trcvd associated with all others nodes is greater than or equal to the value of Tcommit associated with the waiting committing process. If the determination of step 550 is negative, then processing proceeds to step 570. If the determination of step 550 is positive, then processing proceeds to step 560.

In step 560, the committing process is notified that it may become unblocked. After performing step 560, processing proceeds to step 570.

In an embodiment, a committing node may skip sending a commit propagation message to a remote node if Tsent associated with the receiving node is not less than the timestamp attached to the message being sent. As the committing node may skip sending the commit propagation message to a remote node, it is possible that the Trcvd for that remote node does not become greater than or equal to Tcommit until the heartbeat-interval. This may happen, for example, if during the period of time since the transaction was assigned a Tcommit time, the committing node did not receive any messages from the remote node. If the heartbeat-interval is higher than the latency of a disk log force, then the commit latency may be increased. To avoid increasing the commit latency, the committing node may send a commit propagation message to a remote node that it had previously skipped if Trcvd for that node does not become greater than or equal to Tcommit within a specified time period, which is less than the latency of the log force. In other embodiments, the problem of increasing the commit latency may be avoided by the practice of each node in the database server system 200 acknowledging every message with the current timestamp, and not just the commit propagation message.

In another embodiment, the probability of sending commit propagation messages and acknowledgment messages may be reduced. As the time required to send a commit propagation message is significantly less than the time requirement of the log force, some embodiments may delay the transmission of the commit propagation message and/or acknowledgment message for a specified period of time to increase the probability that Tsent is greater than Tcommit at the committing node or the remote node. This specified delay in transmitting the commit propagation message and/ or acknowledgment message may not increase the latency of the commit itself, because in many systems the latency of the log force has an order of magnitude higher than the latency between consecutive messages sent to a remote node. For example, the log force may take 10 ms whereas two messages may be sent to a remote node every 1 ms. The commit propagation message may include with it a time, referred to as 'Twait', which informs the remote node how long to wait until acknowledging the message. For example, if the committing node skipped a commit propagation message to a particular node and later decided to send the message since Trcvd did not become greater or equal to Tcommit, the commit propagation message can have Twait set to 0 (because it has already waited for a message from this node). Otherwise, if the commit propagation message was sent immediately after the redo log force was started, Twait can be set to 5 ms because the committing node can wait longer to receive an acknowledgment from the remote node.

Although flowcharts 300, 400, 500, 600, and 700 depict a particular set of steps in a particular order, other implementations may use fewer or more steps, in the same or different order, than those depicted in FIGS. 3–7.

IV. Implementing Mechanisms

Figure 8:
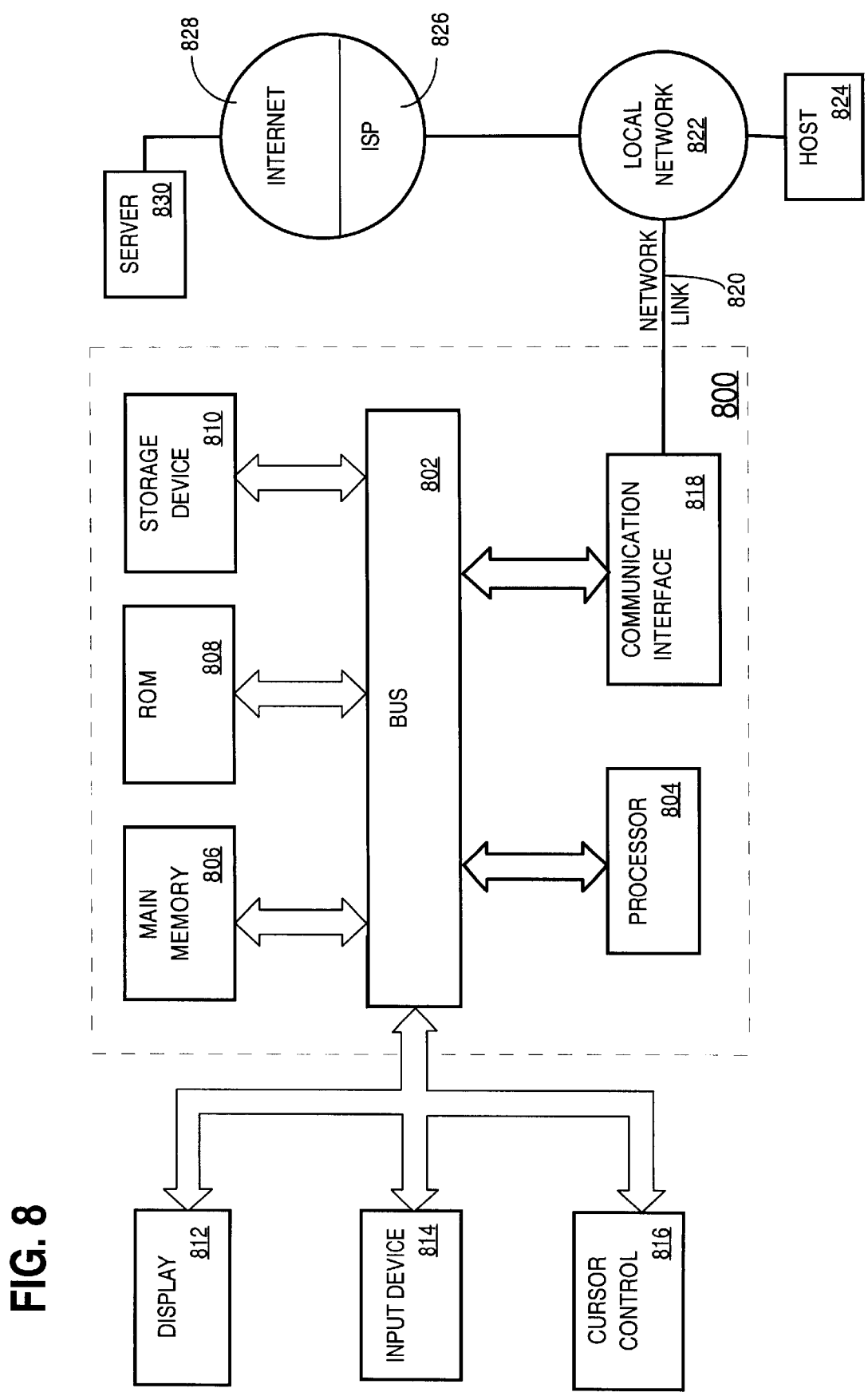
FIG. 8 is a block diagram that illustrates a computer system 800 upon which an embodiment of the invention may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for propagating commit times between a plurality of database servers, comprising the steps of:
   maintaining, at a first database server, a set of one or more values that indicate which timestamps have been exchanged with a second database server that shares access to a common database with said first database server; and
   in response to committing a transaction that involves said common database, the first database server determining whether to send a commit timestamp associated with said transaction to said second database server based, at least in part, on said set of one or more values.

2. The method of claim 1, wherein said one or more values includes Tsent, wherein Tsent is a timestamp associated with the most recent message sent from said first server to said second server.

3. The method of claim 2, wherein the step of determining whether to send said commit timestamp includes determining whether Tsent is more recent than said commit timestamp.

4. The method of claim 3, further comprising the step of:
   if Tsent is more recent than said commit timestamp, then not sending said commit timestamp.

5. The method of claim 4, further comprising the steps of:
   maintaining Trecv as one of said one or more values, wherein Trecv is a timestamp associated with the most recent message received by said first server sent from said second server;
   if Tsent is not more recent than said commit timestamp, then determining if Trecv is more recent than said commit timestamp, and
   if said commit timestamp is more recent than both Tsent and Trecv, then sending said commit timestamp after a configurable period of time expires.

6. The method of claim 5, wherein said configurable period of time is configured such that there is no delay prior to sending said commit timestamp.

7. The method of claim 2, further comprising the step of:
   in response to receiving said commit timestamp at said second database server, transmitting an acknowledgement message to the first database server only if Tsent is less recent than the commit timestamp.

8. The method of claim 7, wherein the step of transmitting said acknowledgement message is performed by transmitting the acknowledgement message after expiration of a specified delay period.

9. The method of claim 1, wherein said one or more values includes Trecv, wherein Trecv is a timestamp associated with the most recent message received by said first server sent from said second server.

10. The method of claim 9, further comprising the step of:

upon updating Trecv, determining if a waiting committing process at the first database server exists.

11. The method of claim 10, further comprising the step of:

upon determining the existence of the waiting committing process, determining if the updated value of Trecv is more recent than the commit time of the transaction.

12. The method of claim 11, further comprising the step of:

if the updated value of Trecv is more recent than the commit time of the transaction, then determining if the most recent message received from any other member in said plurality of database servers is greater than the commit time of the transaction; and if the most recent message received from any other member in said plurality of database servers is greater than the commit time of the transaction, then unblocking the waiting committing process.

13. The method of claim 1, wherein said set of one or more values maintained by said first database server is a first set of one or more values, and further comprising the step of:

maintaining, at said second database server, a second set of one or more values that indicate which timestamps have been exchanged with said first database server.

14. The method of claim 1, wherein said first database server and said second database server are members in said plurality of database servers, and each member of said plurality of database servers share access to said common database, and each member of said plurality of database servers maintains one or more values that indicate which timestamps have been exchanged between each other member in said plurality of database servers.

15. A method for propagating commit times between a plurality of database servers, comprising the steps of:

maintaining a first set of timestamps and a second set of timestamps at a first database server in the plurality of database servers, wherein each of the plurality of database servers has access to a common database, each timestamp in the first set of timestamps is the most recent timestamp associated with a message that has been sent to a particular database server in the plurality of database servers from the first database server, each timestamp in the second set of timestamps is the most recent timestamp associated with a message that has been received by the first database server in the plurality of database servers from a particular database server in the plurality of database servers, wherein the first database server maintains a different timestamp in the first set of timestamps and a different timestamp in the second set of timestamps for each of the plurality of database servers other than the first database server, and wherein each of the plurality of database servers other than the first database is associated with a single timestamp in the first set of timestamps and a single timestamp in the second set of timestamps;

receiving a notification that a transaction initiated by the first database server performed against the common database is to be committed, wherein the transaction is associated with a commit time; and transmitting a commit propagation message from the first database server to a second database server in the plurality of database servers if the commit time is more recent than both a timestamp in the first set of timestamps associated with the second database server and a timestamp in the second set of timestamps that is associated with the second database server.

16. A computer-readable medium carrying one or more sequences of instructions which, when executed by one or more processors, causes the one or more processors to perform the method recited in claim 1.

17. A computer-readable medium carrying one or more sequences of instructions which, when executed by one or more processors, causes the one or more processors to perform the method recited in claim 2.

18. A computer-readable medium carrying one or more sequences of instructions which, when executed by one or more processors, causes the one or more processors to perform the method recited in claim 3.

19. A computer-readable medium carrying one or more sequences of instructions which, when executed by one or more processors, causes the one or more processors to perform the method recited in claim 4.

20. A computer-readable medium carrying one or more sequences of instructions which, when executed by one or more processors, causes the one or more processors to perform the method recited in claim 5.

21. A computer-readable medium carrying one or more sequences of instructions which, when executed by one or more processors, causes the one or more processors to perform the method recited in claim 6.

22. A computer-readable medium carrying one or more sequences of instructions which, when executed by one or more processors, causes the one or more processors to perform the method recited in claim 7.

23. A computer-readable medium carrying one or more sequences of instructions which, when executed by one or more processors, causes the one or more processors to perform the method recited in claim 8.

24. A computer-readable medium carrying one or more sequences of instructions which, when executed by one or more processors, causes the one or more processors to perform the method recited in claim 9.

25. A computer-readable medium carrying one or more sequences of instructions which, when executed by one or more processors, causes the one or more processors to perform the method recited in claim 10.

26. A computer-readable medium carrying one or more sequences of instructions which, when executed by one or more processors, causes the one or more processors to perform the method recited in claim 11.

27. A computer-readable medium carrying one or more sequences of instructions which, when executed by one or more processors, causes the one or more processors to perform the method recited in claim 12.

28. A computer-readable medium carrying one or more sequences of instructions which, when executed by one or more processors, causes the one or more processors to perform the method recited in claim 13.

29. A computer-readable medium carrying one or more sequences of instructions which, when executed by one or more processors, causes the one or more processors to perform the method recited in claim 14.

30. A computer-readable medium carrying one or more sequences of instructions which, when executed by one or more processors, causes the one or more processors to perform the method recited in claim 15.

* * * * *

UNITED STATES PATENT AND TRADEMARK OFFICE
CERTIFICATE OF CORRECTION

PATENT NO. : 6,823,347 B2
DATED : November 24, 2004
INVENTOR(S) : Sashikanth Chadrasekaran Page 1 of 1

It is certified that error appears in the above-identified patent and that said Letters Patent is hereby corrected as shown below:

<u>Title page,</u>
Item [56], References Cited, U.S. PATENT DOCUMENTS, please add:
-- 4,817,091   3/1989   Katzman et al.   714/8
   6,125,368   9/2000   Bridge et al.    707/201
   6,243,702   6/2001   Bamford et al.   707/8 --

Signed and Sealed this

Eighth Day of February, 2005

JON W. DUDAS
*Director of the United States Patent and Trademark Office*

UNITED STATES PATENT AND TRADEMARK OFFICE
CERTIFICATE OF CORRECTION

PATENT NO. : 6,823,347 B2  Page 1 of 1
APPLICATION NO. : 10/422281
DATED : November 23, 2004
INVENTOR(S) : Sashikanth Chadrasekaran It is certified that error appears in the above-identified patent and that said Letters Patent is hereby corrected as shown below:

Title page,
Item [56], References Cited, U.S. PATENT DOCUMENTS, please add:
-- 4,817,091   3/1989   Katzman et al.   714/8
   6,125,368   9/2000   Bridge et al.    707/201
   6,243,702   6/2001   Bamford et al.   707/8 --

This certificate supersedes Certificate of Correction issued February 8, 2005.

Signed and Sealed this

Twenty-seventh Day of November, 2007

JON W. DUDAS
*Director of the United States Patent and Trademark Office*